US008036145B2

(12) United States Patent
Power et al.

(10) Patent No.: US 8,036,145 B2
(45) Date of Patent: Oct. 11, 2011

(54) FRAME STRUCTURE FOR A WIRELESS COMMUNICATION SYSTEM

(75) Inventors: Kevin Power, West Drayton (GB); Michael John Beems Hart, London (GB)

(73) Assignee: Fujitsu Limited, Kawasaki (JP)

( * ) Notice: Subject to any disclaimer, the term of this patent is extended or adjusted under 35 U.S.C. 154(b) by 103 days.

(21) Appl. No.: 12/431,220

(22) Filed: Apr. 28, 2009

(65) Prior Publication Data

US 2009/0257366 A1    Oct. 15, 2009

Related U.S. Application Data

(63) Continuation of application No. PCT/GB2008/000957, filed on Mar. 18, 2008.

(30) Foreign Application Priority Data

Nov. 6, 2007    (GB) .................................. 0721763.1

(51) Int. Cl.
*H04J 3/00*    (2006.01)
*H04W 72/04*    (2009.01)
(52) U.S. Cl. ...................... 370/280; 370/330; 455/452.1
(58) Field of Classification Search .................. 370/280, 370/329, 294, 330, 342–343, 478; 375/260; 455/452.1
See application file for complete search history.

(56) References Cited

U.S. PATENT DOCUMENTS

| | | | |
|---|---|---|---|
| 7,450,559 B2 * | 11/2008 | Schotten et al. .............. | 370/348 |
| 2004/0141522 A1 | 7/2004 | Texerman et al. | |
| 2006/0002323 A1 * | 1/2006 | Hildebrand et al. .......... | 370/321 |
| 2007/0286147 A1 | 12/2007 | Wang et al. | |
| 2008/0080422 A1 * | 4/2008 | Frederiksen et al. ......... | 370/329 |
| 2008/0095195 A1 * | 4/2008 | Ahmadi et al. ............... | 370/478 |
| 2008/0137562 A1 | 6/2008 | Li et al. | |
| 2009/0046649 A1 * | 2/2009 | Gao et al. ...................... | 370/329 |
| 2009/0067377 A1 * | 3/2009 | Talukdar et al. .............. | 370/329 |
| 2009/0092085 A1 * | 4/2009 | Ramesh et al. ............... | 370/329 |
| 2009/0109906 A1 * | 4/2009 | Love et al. .................... | 370/329 |

(Continued)

FOREIGN PATENT DOCUMENTS

EP    1 206 055    5/2002

(Continued)

OTHER PUBLICATIONS

International Search Report and Written Opinion of the International Searching Authority, dated Aug. 7, 2008 from the corresponding International application No. PCT/GB2008/000957.

(Continued)

*Primary Examiner* — Kwang B Yao
*Assistant Examiner* — Candal Elpenord
(74) *Attorney, Agent, or Firm* — Katten Muchin Rosenman LLP

(57) ABSTRACT

A frame format used in a wireless communication system, more particularly an OFDMA TDD wireless communication system, of the kind that includes a base station and a plurality of fixed or mobile subscriber stations, the base station maintaining connections with each of the subscriber stations by performing wireless communication in units of frames having the frame format, and within each frame, allocating resources for data transmission and signalling. Each frame has a plurality of downlink subframes and a plurality of uplink subframes including, in time order, a first downlink subframe, a first uplink subframe, a final downlink subframe and a final uplink subframe. One or more further downlink subframe/uplink subframe pairs may be interposed between the first and final subframes as desired, and the configuration can be changed dynamically.

4 Claims, 7 Drawing Sheets

U.S. PATENT DOCUMENTS

2009/0131110 A1* 5/2009 Balachandran et al. ...... 455/561
2009/0185632 A1* 7/2009 Cai et al. ........................ 375/260

FOREIGN PATENT DOCUMENTS

| | | |
|---|---|---|
| EP | 1 798 883 | 6/2007 |
| WO | 2005/109705 | 11/2005 |
| WO | 2008/039027 | 4/2008 |

OTHER PUBLICATIONS

Great Britain Search Report dated Nov. 29, 2007, from corresponding Great Britain Application No. GB0721763.1.

Richard O. Lamaire, et. al, "Wireless LANs and Mobile Networking: Standards and Future Directions", IEEE Communications Magazine, Aug. 1, 1996, pp. 1-15, IEEE Service Center, Piscataway, NJ, U.S.

"IEEE Std. 802.16, Part 16: Air Interface for Fixed Broadband Wireless Access Systems" IEEE Computer Society and the IEEE Microwave Theory and Techniques Society, Oct. 1, 2004.

"IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.

\* cited by examiner

FRAME STRUCTURE FOR A WIRELESS COMMUNICATION SYSTEM

TECHNICAL FIELD

The present invention relates to wireless communication systems of the type in which a base station (BS) communicates with multiple fixed or mobile subscriber stations (MS).

BACKGROUND ART

Recently, various standards have been developed for data communication over broadband wireless links. One such standard is set out in the IEEE 802.16 specifications and is commonly known as WiMAX. Existing specifications include IEEE 802.16-2004, primarily intended for systems having fixed subscriber stations, and IEEE 802.16e-2005 which among other things provides for mobile subscriber stations. Currently under development, the IEEE 802.16m project (also called Advanced WiMAX or Gigabit WiMAX) proposes using advanced techniques, including multiple antennas, to provide high data rates to mobile subscriber stations. In the following description, the term mobile station (MS) is used as shorthand for both mobile and fixed subscriber stations. The term "user" is also used equivalently to mobile station. Further, "legacy MS" or "legacy user" refers to a mobile station operating in accordance with the current WirelessMAN-OFDMA specification (IEEE 802.16e-2005) and using the feature set specified in the WiMAX forum system profile (Release 1.0).

The entire contents of IEEE Std 802.16-2004 "Air Interface for Fixed Broadband Wireless Access Systems" and IEEE Std 802.16e-2005 "Amendment 2 and Corrigendum 1 to IEEE Std 802.16-2004" are hereby incorporated by reference.

In systems of the above type, data is communicated by exchange of packets between the mobile stations and base station whilst a connection (management connection or transport connection), having a connection ID, is maintained between them. The direction of transmission of packets from the subscriber station to the base station is the uplink (UL), and the direction from the base station to the subscriber station is the downlink (DL). Transmission of data packets takes place within "frames" which are the predetermined unit of time in the system, each frame conventionally having one downlink subframe followed by one uplink subframe, these in turn being divided in the time and frequency domain into a number of slots, and when utilising multiple transmit antennas possibly also divided spatially into a number of streams. At the physical layer level, transmission of data involves combining groups of subcarriers (available frequencies in the system) to form "symbols" by employing the well-known technique of OFDMA (Orthogonal Frequency Division Multiple Access). The base station can apply different modulation and coding schemes (MCS) within distinct zones of a subframe, for example to provide high data throughput to nearby users, whilst providing a more robust signal to more distant users or users moving with high mobility.

Various physical layer implementations are possible in an IEEE 802.16 network, depending on the available frequency range and application, including a time division duplex (TDD) mode, which involves operating the two links on the same frequency band, but subdividing the access to the medium in time so that only the DL or the UL will be utilizing the medium at any one point in time. The remainder of this specification will refer to a TDD mode WiMAX system by way of example.

Thus, in the TDD mode, conventionally each frame is divided into one DL subframe followed by one UL subframe, as shown in FIG. 1. The DL-subframe includes a broadcast control field with a DL-MAP and UL-MAP, by which the BS informs the MSs of the allocations within the DL and UL. The MAP is a map of bandwidth allocation in the frame and also contains other PHY signalling related messages. It consists of Information Elements (IE) each containing a connection ID. The map IEs inform mobile stations to which burst(s) they have been assigned to receive or transmit information.

The 802.16e-2005 standard specifies many possible frame durations ranging from 2 ms to 20 ms in length. However, the current WiMAX forum profile (Release 1.0), specifies that only 5 ms frames shall be used as this will ensure that all WiMAX forum certified equipment is interoperable. Although the 5 ms frame is widely accepted, it is believed that use of this frame length will create latency issues which can cause problems for users travelling with medium to high mobility. Users travelling at high mobility may experience rapid changes in channel conditions and will require fast link adaptation in order to sustain adequate performance and throughput. However, with a 5 ms frame this fast link adaptation becomes difficult as the minimum time that any specific MS can have their Modulation and Coding Scheme (MCS) adapted to the prevailing propagation link is 5 ms. In this case, the MS will calculate a channel quality measurement based on the Physical or Effective Carrier-to-Interference-and-Noise Ratio CINR which will provide information on the actual operating condition of the receiver, including interference and noise levels, and signal strength. This information is then fed back to the BS via CQI feedback channel (CQICH) in the uplink and as a result the BS can perform link adaptation for the MS. As mentioned above, users moving at high speeds will experience rapid variations in channel conditions especially within a 5 ms time frame and it is therefore highly possible that an MS will feedback channel quality information that at the time of scheduling will not correctly represent the channel at the time of transmission. The result of this inaccurate representation in channel quality information may degrade the performance and throughput experienced by the MS.

In order to support users travelling at higher speeds then it is apparent that the frame duration must be reduced to facilitate fast and efficient link adaptation. However, as technology evolves then backward compatibility can become a major issue which is particularly true in the case of the current IEEE 802.16m project. The aim of this IEEE project is to provide an amendment to the legacy IEEE 802.16e-2005 standard where the purpose of this amendment is to provide performance improvements necessary to support future advanced services and applications. One requirement of this project is to reduce latency as far as feasible without infringing the strict legacy support requirements. As mentioned above, the frame duration can be reduced which can ultimately reduce latency but this must be achieved so as not to affect the performance of a legacy MS. In other words, the IEEE 802.16m BS must be able support legacy MSs whilst also supporting IEEE 802.16m MSs at a level of performance equivalent to that which a legacy BS provides to a legacy MS.

Referring again to FIG. 1, in the legacy IEEE 802.16e-2005 TDD frame structure, the first symbol is occupied by a Preamble which is mainly used for synchronisation purposes. On the second and third symbols following the Preamble is the frame control header FCH. The FCH is transmitted using a well-known format and provides sufficient information to decode the following MAP message, i.e. the MAP message length, coding scheme and active sub-channels. Following the FCH is the DL-MAP which may be followed by the UL-MAP. These MAP messages provide information on the allocated resource (slots) for traffic channels within the frame. These MAP's contain DL-MAP_IE's and UL-MAP_IE's which define bursts within the frames, (i.e. one MAP_IE will be related to 1 burst within the frame). The information within these MAP_IE's, such as the subchannel offset and symbol offset are crucial as these are used by the MS to locate the resource within the subframes. Other information such as the CID (Connection ID), the modulation and coding scheme and the number of subchannels are also crucial as these will allow for successful demodulation and decoding of the data within the burst. Following the DL and UL MAPs, there may be a Downlink Channel Descriptor (DCD) and/or an Uplink Channel Descriptor (UCD) present. The DCD and UCD will be transmitted by the Base Station (BS) at a periodic interval to define the downlink and uplink physical channels. This information will be TLV encoded and may include parameters such as, the TTG and RTG times, as will be explained in more detail below, centre frequency, BS ID, frame duration and Handover type. Also contained within the DCD and UCD will be a description of the burst profiles that are used for bursts within the downlink and uplink subframes. This information will also be TLV (type/length/value) encoded and may include information such as, FEC type, encoding rate and modulation. Once defined, these profiles will then be referred to in DL and UL MAP_IE's in later frames via a numerical index called Downlink Interval Usage Code (DIUC) and Uplink Interval Usage Code (UIUC). In the IEEE 802.16 standard, different numerical values of DIUC and UIUC are used to stipulate the burst profiles being used, however some values within DIUC/UIUC can be used to denote different zone profiles such as a PAPR (Peak to Average Power Ratio) reduction zone. In this case DIUC/UIUC=13 will ensure that a PAPR reduction zone is created where the base station transmits non information carrying signals in order to reduce the peak to average ratio of the transmitted waveform, as well as providing coverage-enhancing safety zones to avoid interference with other base stations.

From decoding the DL-MAP_IE and UL-MAP_IEs (which contain the DIUC and UIUC respectively) the Mobile Station (MS) can determine the bursts and associated burst profiles (i.e the modulation and coding scheme) to which its connections are associated within the downlink and uplink subframes. If any of the configurations change within either of the TLV encoded information for the physical channel or the burst profiles then the DCD and/or UCD must be updated and transmitted as before (i.e. after the DL and UL MAPs).

Considering the case where an IEEE 802.16m BS must support some legacy MSs then the above signalling must be present in the first zone of the DL sub-frame following the preamble in order for legacy MSs to determine their resource allocations within the DL and UL sub-frames. It is anticipated however that the initial IEEE 802.16m network rollout will involve the installation of IEEE 802.16m BSs where a large percentage of terminals using these BSs will only support the legacy IEEE 802.16e-2005 standard. However, it is also anticipated that over time this large percentage will gradually decrease as most users will eventually switch from using legacy equipment to using IEEE 802.16m terminals. It would therefore be advantageous for the IEEE 802.16m frame structure to be capable of an almost seamless transition from a legacy-like system to an IEEE 802.16m system. The state of this transition will solely depend on the percentage of legacy terminals wishing to access the network. As the number of legacy users decrease then it would be expected that the performance of the IEEE 802.16m MSs should improve and vice-versa.

One major constraint in the design of an IEEE 802.16m frame structure is the preamble position that will be used for legacy synchronisation and network entry. This preamble is crucial, and in the current TDD legacy frame structure it is generated every 5 ms (according to the WiMAX forum release 1.0 profile). Therefore, this preamble must be present in the proposed frame structure which will constrain the flexibility in the frame design. As mentioned above, in order to reduce latency then the frame duration must be decreased but as a result with a TDD system this will increase the number of RTG and TTGs therefore increasing the number of wasted symbols. It is important to note that any sub-frames or zones where legacy allocations are made must begin on an integer number of symbols from the beginning of either the UL or DL legacy subframes. It is also crucial when considering the case of small sub-frame durations in the DL, that the first DL sub-frame must contain an adequate number of symbols to accommodate the cumbersome legacy signalling (i.e, FCH, DL and UL MAPs etc.).

DISCLOSURE OF INVENTION

Accordingly, it would be desirable to provide a wireless communication system which improves latency for highly-mobile users of enhanced subscriber stations whilst remaining fully compatible with legacy subscriber stations.

According to a first aspect of the present invention, there is provided a wireless communication system comprising a base station and a plurality of fixed or mobile subscriber stations, the base station maintaining connections with each of the subscriber stations by performing wireless communication in units of frames, and within each frame, allocating resources for data transmissions and signalling in the wireless communication system, said frames being divided timewise into downlink subframes for transmissions from the base station to the subscriber stations, and uplink subframes for transmissions from the subscriber stations to the base station; characterized in that each frame has a plurality of downlink subframes and a plurality of uplink subframes including, in time order, a first downlink subframe, a first uplink subframe, a final downlink subframe and a final uplink subframe.

Preferably, a preamble for synchronisation purposes is provided at the start of the first downlink subframe only.

Preferably, the subscriber stations comprise first type subscriber stations and second type subscriber stations, the base station allocating downlink resources to the first type subscriber stations only within the first downlink subframe.

The base station is preferably further arranged to allocate uplink resources to the first type subscriber stations only within the final uplink subframe. The base station may allocate resources to the second type subscriber stations at least within the first uplink subframe and the final downlink subframe.

At least one other downlink subframe and uplink subframe, reserved for allocation of resources to the second type subscriber stations, may be provided before the final downlink subframe and final uplink subframe. Preferably, each second type subscriber station is arranged to return channel quality information to the base station during at least one uplink subframe within which it is allocated resources, the base station being responsive to said connection quality information when allocating resources to the same second type subscriber station in a later one of said plurality of downlink subframes or uplink subframes.

The wireless communication system may be in the form of a TDD OFDMA wireless communication system operable in accordance with a plurality of communication standards, the first type subscriber stations being compliant with a first such standard and the second type subscriber stations being compliant with a second such standard which is a development of the first standard.

In this case, preferably, the first standard assumes frames of predetermined length with a single downlink subframe and a single uplink subframe, and the base station is arranged to configure the frame such that the timing of said plurality of downlink subframes and uplink subframes allows the frame to be compatible with said first standard whilst including at least one downlink subframe and uplink subframe reserved for use by the second-type subscriber stations.

Preferably also, each downlink subframe is separated from its succeeding uplink subframe, and each uplink subframe is separated from its succeeding downlink subframe if any, by a respective defined time gap, and the base station is arranged to set the duration of at least one such gap, which follows one of the subframes reserved for the second-type subscriber stations, to make the frame compatible with said first standard.

The data may be transmitted in the system using symbols of predetermined duration, each subframe including an integral number of said symbols, and the duration of said at least one gap may be set such that a set of said symbols occur at timings in accordance with both said first standard and said second standard.

This set of symbols preferably occurs in the final uplink subframe to be available for allocating resources to the first-type subscriber stations.

In one implementation of the system, each frame is a superframe which includes a plurality of frames in accordance with said first standard, such that resources can be allocated to the second type subscriber stations in any of the subframes of the superframe.

In the above-defined wireless communication system, the first standard may be IEEE 802.16e. The second standard may be IEE802.16m.

The base station may be operable to vary the number of downlink subframes and uplink subframes dynamically during operation of the wireless communication system. It may do so responsive to the relative number of first type and second type subscriber stations when varying the number of downlink subframes and uplink subframes.

Preferably, each second-type subscriber station is configured to recognise changes in the number and/or durations of the downlink subframes and the uplink subframes.

A central controller may be provided in the system which is operable to instruct the base station for varying the number and/or durations of the downlink subframes and/or the uplink subframes.

According to a second aspect of the present invention, there is provided a base station for use in wireless communication system with a plurality of fixed or mobile subscriber stations which comprise legacy subscriber stations and enhanced subscriber stations, the base station maintaining connections with each of the subscriber stations by performing wireless communication in units of frames, and within each frame, allocating resources for data transmissions and signalling in the wireless communication system, said frames being divided timewise into downlink subframes for transmissions from the base station to the subscriber stations, and uplink subframes for transmissions from the subscriber stations to the base station, wherein the base station is arranged to: configure each frame with a plurality of downlink subframes and a plurality of uplink subframes including, in time order, a first downlink subframe, a first uplink subframe, a second downlink subframe and a second uplink subframe; allocate downlink resources to the legacy subscriber stations only within the first downlink subframe; and allocate resources to the enhanced subscriber stations at least within the first uplink subframe and the second downlink subframe.

Preferably, the base station is responsive to connection quality information, fed back by each enhanced subscriber station in a said uplink subframe in which the base station has allocated it resources, when allocating resources to the same enhanced subscriber station in a later one of said plurality of downlink subframes or uplink subframes.

The legacy subscriber stations may operate in accordance with a frame of predetermined length with a single downlink subframe and a single uplink subframe, in which case the base station is arranged to configure the frame such that the timing of said plurality of downlink subframes and uplink subframes allows the frame to include uplink resources for the legacy subscriber stations whilst including at least one downlink subframe and uplink subframe reserved for use by the enhanced subscriber stations.

Preferably, each downlink subframe is separated from its succeeding uplink subframe, and each uplink subframe is separated from its succeeding downlink subframe if any, by a respective time gap and the base station is arranged to set the duration of at least one such gap, which follows one of the subframes reserved for the enhanced subscriber stations, in accordance with said predetermined frame length to allow the frame to be decoded by the legacy subscriber stations.

In this case the base station may be arranged to configure each frame as a superframe which includes a plurality of said frames of predetermined length in accordance with which the legacy subscriber stations operate, and arranged to allocate resources to the enhanced subscriber stations in any of the subframes of the superframe.

The base station may be operable to vary dynamically the number of downlink subframes and uplink subframes in each frame or superframe in accordance with the relative proportion of enhanced subscriber stations to legacy subscriber stations currently being served by the base station.

According to a third aspect of the present invention, there is provided a frame format used in a wireless communication system of the kind comprising a base station and a plurality of fixed or mobile subscriber stations, the base station maintaining connections with each of the subscriber stations by performing wireless communication in units of frames having said frame format, and within each frame, allocating resources for data transmissions and signalling in the wireless communication system; said frame format being divided timewise into downlink subframes for transmissions from the base station to the subscriber stations, and uplink subframes for transmissions from the subscriber stations to the base station; characterized in that each frame has a plurality of downlink subframes and a plurality of uplink subframes including, in time order, a first downlink subframe, a first uplink subframe, a final downlink subframe and a final uplink subframe.

Preferably, the first downlink subframe and at least part of the final uplink subframe are used to allocate resources to legacy subscriber stations whilst the other subframes are reserved for use by enhanced subscriber stations.

A preamble may be provided for synchronization of the subscriber stations with the base station and in this case, of said plurality of downlink subframes, only the first downlink subframe includes the preamble.

Preferably, the first downlink subframe and the final uplink subframe are provided for allocation of resources to legacy subscriber stations which are configured to utilize resources in a legacy frame format having only a single uplink subframe and downlink subframe per frame, and at least the first uplink subframe and the final downlink subframe are provided exclusively for allocation of resources to enhanced subscriber stations which are configured to utilize resources in plural subframes within the same frame.

The timing of said plurality of downlink subframes and uplink subframes may be arranged so as to allow the frame to include uplink resources for the legacy subscriber stations whilst including said plurality of downlink subframes and uplink subframes for use by the enhanced subscriber stations.

The timing of the downlink subframe and uplink subframes may be adjusted by varying the duration of at least one time gap between successive subframes, which gap follows one or more of the subframes provided exclusively for allocation of resources to enhanced subscriber stations.

Here, the time gap is preferably a transmit-to-receive transition time gap TTG or a receive-to-transmit transition time gap RTG as specified in an IEEE802.16 wireless communication system.

Also, preferably, each subframe includes an integral number of symbols, and the duration of said at least one gap is defined such that a plurality of said symbols are available in the final uplink subframe at timings expected by the legacy subscriber stations.

The frame format may be reconfigurable to include none, one, or more further downlink subframes and uplink subframes in between the first uplink subframe and the final downlink subframe.

In the frame format, preferably, each frame is of a duration which is a multiple of the legacy frame format, a preamble for synchronization purposes being provided at each timing expected by the legacy subscriber stations.

The frame format may include signalling allocated partly per whole frame duration which is a multiple of the legacy frame format, partly per legacy frame and partly per subframe.

The present invention also embraces a subscriber station providing the second-type subscriber station in the system as set out above, as well as an access service network gateway for use in a WiMAX wireless communication system and providing the central controller referred to above.

According to a further aspect of the present invention, there is provided software which, when executed by a processor of a wireless serving station in a wireless communication system, provides the base station as defined above, as well as software which, when executed by a processor of a wireless information processing terminal, provides the "enhanced" subscriber station referred to above.

Embodiments of the present invention allow an existing frame format, having only one downlink subframe and one uplink subframe, to be replaced by a more flexible, reconfigurable frame format with multiple downlink subframes and uplink subframes, but arranged in such a way that the change is transparent to "legacy" users who expect to receive and send data in the existing frame format. By adding more downlink subframes and uplink subframes within a frame of a given duration, latency for "enhanced" users (i.e. terminals capable of handling the new frame format) can be reduced.

In one possible embodiment of the present invention, the "legacy" subscriber stations are subscriber stations compliant with IEEE802.16e and the "enhanced" subscriber stations are compliant with a later version of the IEEE802.16 standard, such as 802.16m currently under-discussion.

BRIEF DESCRIPTION OF THE DRAWINGS

Reference is made, by way of example only, to the accompanying drawings in which.

MODES FOR CARRYING OUT THE INVENTION

This invention proposes a novel frame structure that has the capability of supporting a mix of IEEE 802.16e-2005 and IEEE 802.16m MSs without causing any degradation in performance for legacy MSs. The frame structure also has the capability of supporting a near seamless transition from a frame structure that almost replicates the existing legacy design to a structure that can significantly reduce latency. The reduction in latency will allow for support of users travelling at high velocities as link adaptation can be performed within a much tighter time frame compared to the existing 5 ms in the current legacy system.

As mentioned previously, the proposed frame structure is designed as to allow support for a mix of legacy IEEE 802.16e-2005 and IEEE 802.16m MSs, where the legacy MSs will see no-degradation in performance due to the change in frame structure. It is proposed that the frame structure be designed around the current limitations of the legacy frame (i.e, the preamble and signalling). As stated above, the preamble is generated every 5 ms which is mainly for used for synchronisation and transmitter identification for network entry and handover. It is therefore crucial that this preamble exist within the proposed frame structure. Consequently, the preamble will be used as a boundary for design which will allow for the DL and UL subframes in between each preamble to be redesigned. This will ensure that a legacy MS can synchronise and then perform network entry.

Figure 2:
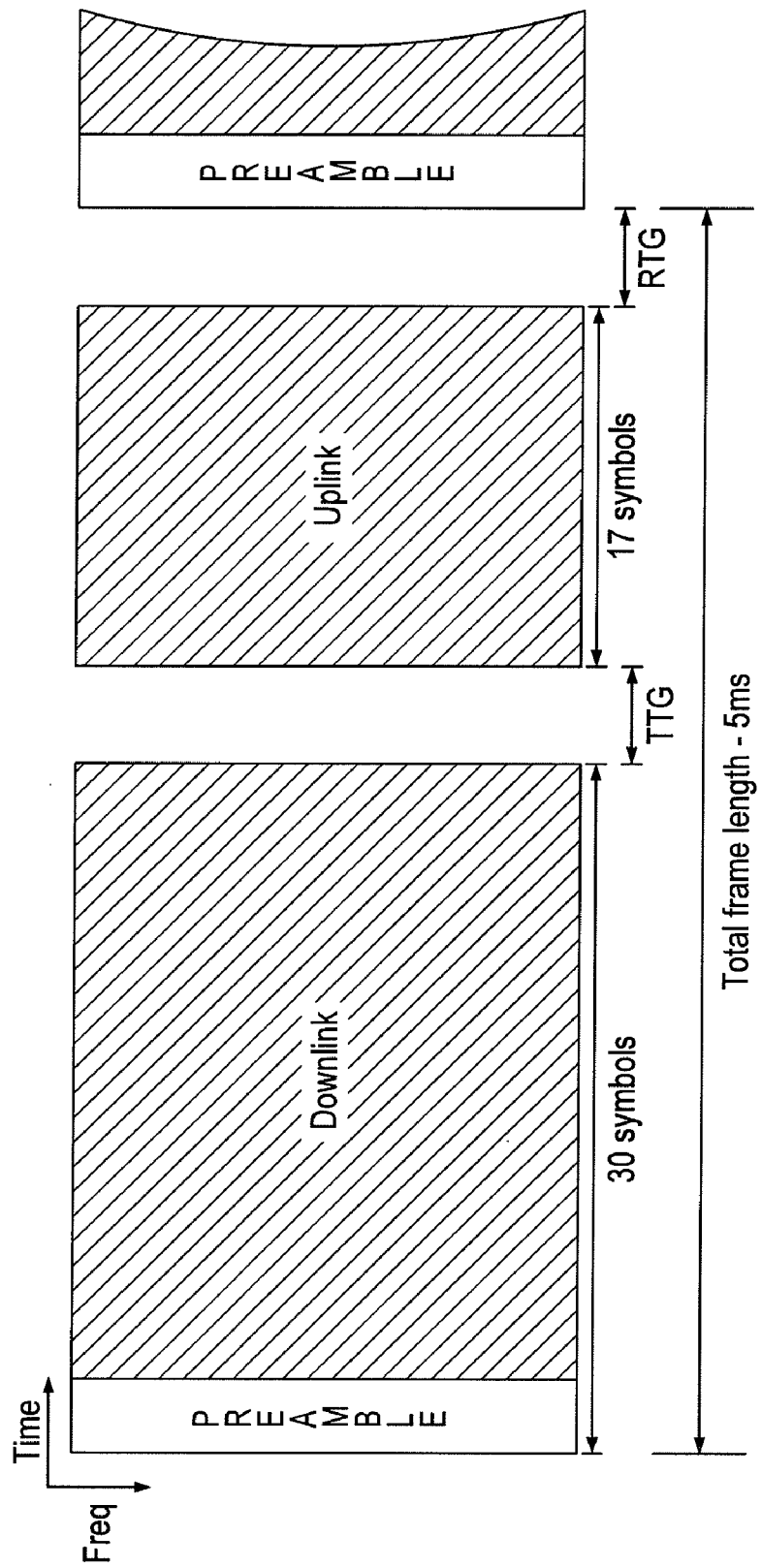
FIG. 2 shows timing relationships in the frame structure of FIG. 1 including guard intervals TTG and RTG.

FIG. 2 illustrates the current IEEE 802.16e-2005 TTD frame structure which includes RTG and TTG. The relative lengths of the downlink subframe and uplink subframe can be varied within the total number of symbols (47 for a 10 MHz bandwidth) which are available. In the example of FIG. 2, the DL (including preamble) occupies 30 symbols and the UL occupies 17 symbols; this can be denoted as (30, 17). However, according to the WiMAX system profile (release 1.0) many other combinations of symbols in the DL and UL from (35, 12) down to (26,21) are permitted.

It is clear from FIG. 2 that there are two time gaps within one legacy 5 ms frame. The TTG represents the Transmit to receive transition time gap and the RTG is referred to as the receive to transmit transition time gap. The TTG allows time for the BS to switch from transmit (Tx) to receive (Rx) mode and also provides time for the MS's to switch over likewise. During this gap, the BS is not transmitting modulated data but simply allowing the BS transmitter carrier to ramp down, the Tx/Rx antenna switch to actuate, and the BS receiver section to activate. As previously mentioned, decreasing the subframe durations and including more subframes per frame will inevitably increase the number of required transition gaps, therefore decreasing the number of data carrying OFDMA symbols per frame. This is a known drawback of creating shorter sub-frame durations in a TDD system.

The TTG and RTG times for a 10 MHz bandwidth, as defined by the WiMAX forum, are as follows:

TTG=296 PS

RTG=168 PS

Where PS (physical slots) is expressed as:

$$PS = \frac{4}{Fs}$$

And Fs is given by:

$$Fs = \text{floor}\left(\frac{n \times BW}{8000}\right) \times 8000$$

where BW is the nominal channel bandwidth, 10 MHz in this case, and n is the oversampling ratio which for a 10 MHz bandwidth is 28/25.

Therefore, for a 10 MHz channel:

$$TTG = 296 \times 3.5714e^{-7}$$
$$= 105.71 \ \mu s$$
$$RTG = 168 \times 3.5714e^{-7}$$
$$= 60 \ \mu s$$

It is important to note that the TTG time is very similar to that of the OFDMA symbol duration $T_s$. The OFDMA symbol duration including ⅛ cyclic prefix for a 10 MHz bandwidth is 102.86 μs. It is important for the proposed frame structure that depending on the chosen DL/UL split (WiMAX forum), the legacy UL subframe must begin after an integer number of symbols, i.e. at $N_{symbols\_in\_DL}$ after the end of the DL subframe plus the TTG. Moreover, the RTG that precedes the Preamble of the following frame must remain at 60 μs.

Figure 3:
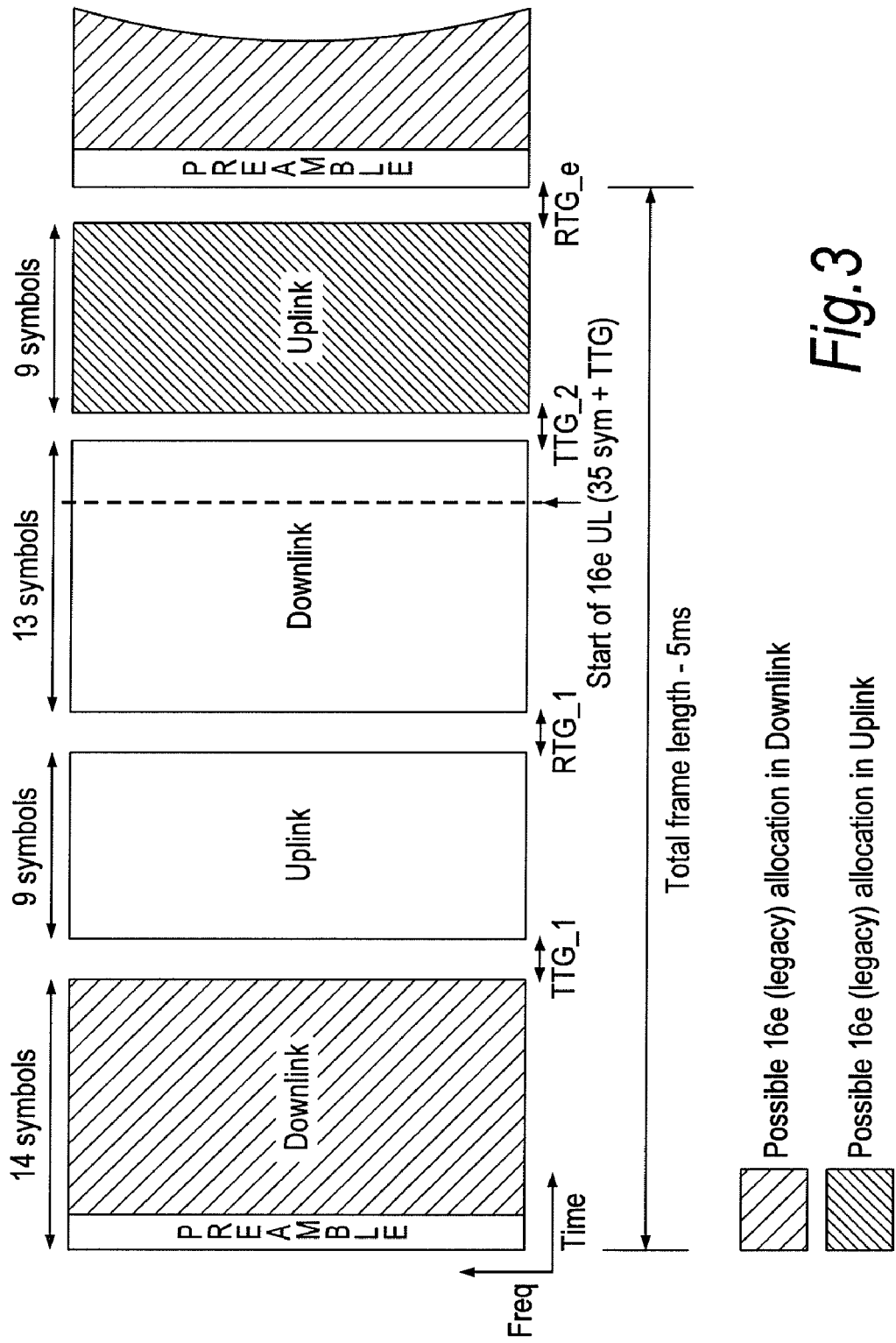
FIG. 3 shows frame timing in a similar way to FIG. 2, for a first example of a frame structure embodying the present invention.

FIG. 3 illustrates an example of the frame structure of an embodiment of the present invention where the 5 ms frame has been dissected into 2 DL sub-frames and 2 UL subframes.

Figure 1:
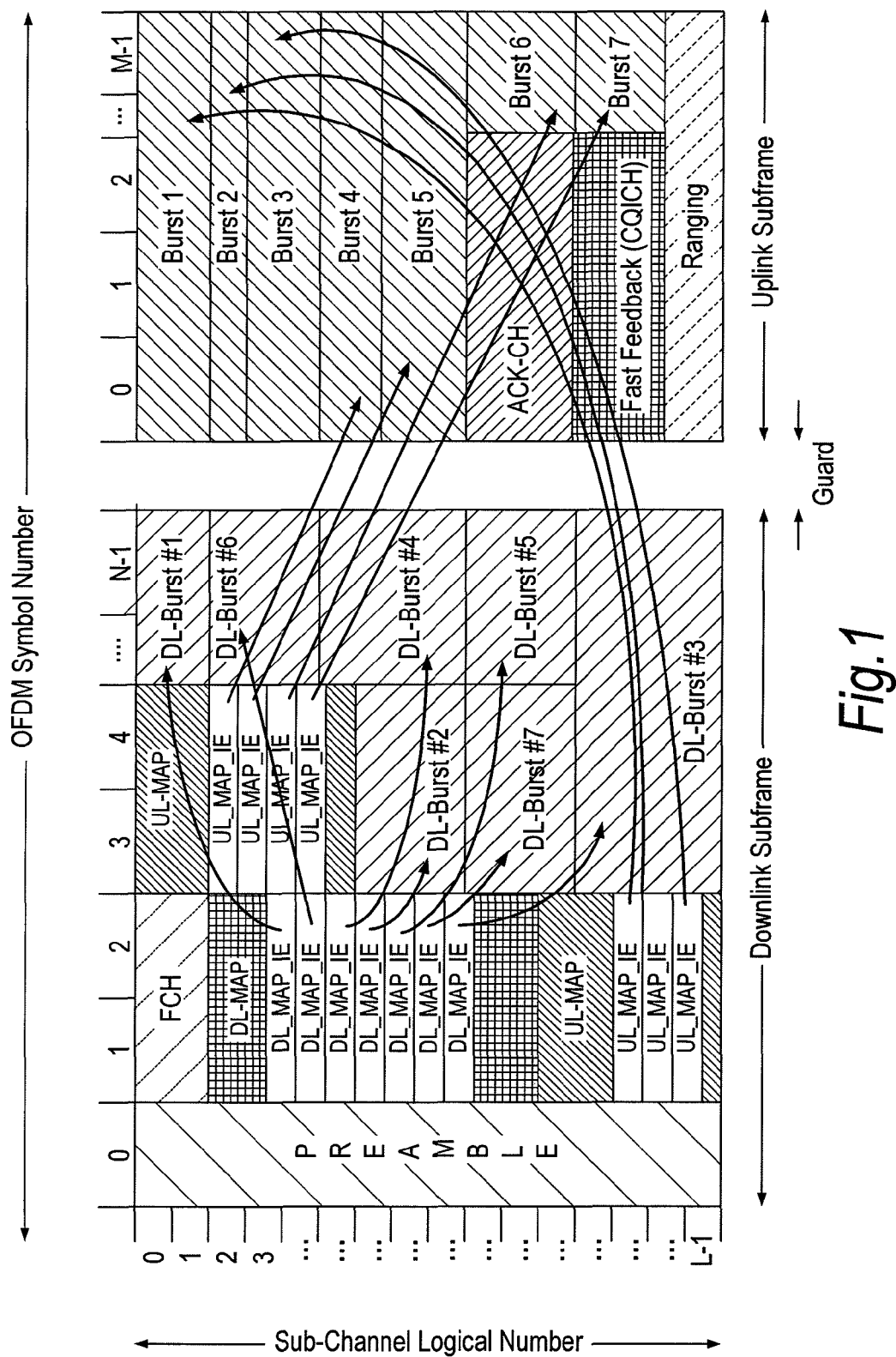
FIG. 1 shows a TDD frame structure in a known IEEE802.16e wireless communication system.

With respect to the frame structure design in FIG. 3, the first zone in the first DL sub-frame shall contain the required legacy signalling which is shown in FIG. 1. This zone will be a PUSC zone and will contain the FCH, DL and UL MAPs etc. These MAPs will then be used by the legacy MSs to determine the resource (if any) assigned to that particular MS. Considering the number of symbols for the DL and UL subframes specified in the WiMAX Release 1.0 profile, then legacy DL and UL allocations must fall within these requirements, meaning that a DL allocation must only be allocated within the specified number of symbols for DL and in similar fashion, a UL allocation must only be made within the specified symbols for UL.

For example, if the legacy MS is assuming a (35, 12) DL/UL split, i.e. a frame using a configuration of 35 symbols in the DL and 12 symbols in the UL, then a DL allocation can only be made within the first 35 symbols, and similarly an UL allocation must be made within the last 12 symbols of the 5 ms frame. Therefore, referring to FIG. 3, the DL allocation shall be made within the first DL subframe. This can be achieved by using the existing legacy DL-MAP, as $N_{symbols\_in\_DL}$, the number of OFDMA symbols in the DL can be specified in the DL-MAP (35 in this case). However, it must be ensured that no actual resource allocations to legacy MSs are made between the 15$^{th}$ and 35$^{th}$ (inclusive) OFDMA symbols as these symbols may be in use by the IEEE 802.16m terminals. This can be achieved by using a DL Zone Switch IE in the DL-MAP, where no DL-MAP_IEs follow the switch IE which will indicate that no MSs are allocated resources within this zone. However, it may be more suitable to use a DL MAP-IE or a DL Zone Switch IE with DIUC=13 as this will prevent a legacy MS from decoding the pilots in a zone in which it doesn't have an allocation. (Note, the DL Zone Switch IE includes an OFDMA symbol offset which is used to indicate the start of the zone. The end of the zone determined by the last symbol in the DL subframe or by the symbol offset of the next DL Zone Switch IE, if any). The use of a MAP-IE or Zone Switch IE with DIUC=13 can create a gap in the frame that can be used solely for 16m transmissions and referring to the above example this gap will begin at symbol 15 and continue to the end of the legacy DL subframe (i.e., 35$^{th}$ symbol).

Now, considering the UL allocations, the start of the UL allocation is defined in the UL-MAP by means of the Allocation Start time field which is represented in PSs from the start of the DL frame in which the UL-MAP message occurred. With respect to FIG. 3, the UL subframe for legacy users must begin at a timing given by $N_{symbols\_in\_DL} \times T_s + TTG$, where $T_s$ is the symbol duration, as this allows for 12 symbols to be present between the start of the legacy UL subframe and the RTG_e which precedes the Preamble of the next frame. However, it is clear from FIG. 3 that no legacy allocations are actually made until the second UL subframe of the proposed frame structure as the resources between the start of the legacy UL subframe and the actual legacy allocations will be in use by 16m terminals. This can be achieved by specifying the number of OFDMA symbols in the UL-MAP (i.e., 12 for this example) and then using a UL-MAP-IE or a UL_Zone_Switch-IE with UIUC=13 as this indicates that a gap comprised of an integer number of symbols will be present from the beginning of the legacy UL until the subframe where the legacy allocations are made (i.e, in the second UL subframe of the FIG. 3 frame structure).

To help support backwards compatibility, the beginning of the zone where the UL legacy allocations are made must start on an integer number of symbols from the notional beginning of the legacy UL subframe (i.e, $N_{symbols\_in\_DL} \times T_s + TTG$, where $N_{symbols\_in\_DL}$ denotes the number of symbols in the legacy DL subframe: 35 in the present example). This can be achieved by altering the duration of TTG_2 (see FIG. 3), as this TTG will only be used for 16m and will not effect the backwards compatibility of legacy 16e terminals. For example, the second UL subframe where the legacy allocations begin, can be configured to begin on the 4$^{th}$ symbol from the beginning of the legacy UL, this will then allow for 9 symbols to be used for legacy allocations as shown in FIG. 3. In this way, at least part of the final UL subframe (the second subframe in the example of FIG. 3) is reserved for legacy UL allocations. It is also important to note that TTG_1 and RTG_2 can be set at any desired values as all 16e DL allocations are made prior to these transition gaps.

Referring to the example in FIG. 3, in order to calculate TTG_2 let us assume that:—

TTG_1=RTG_2=1 OFDMA symbol=$T_s$=102.86 μs

And, RTG_e=60 μs

Therefore, the start of the legacy UL can be determined by;

$$N_{symbols\_in\_DL} \times T_s + TTG = (35 \times 102.86 \text{ μs}) + 105.71 \text{ μs}$$
$$= 0.00370581 \text{ seconds}$$

The start of the second UL subframe where the legacy allocations are present can be expressed as:

$$\text{Start of Second } UL \text{ subframe} = (N_{symbols\_in\_DL} \times T_s + TTG) +$$
$$(3 \times 102.86 \text{ μs})$$
$$= 0.004014390 \text{ seconds}$$

which is effectively an offset of 3 symbols from where the legacy MS expects the UL subframe to start.

The legacy frame duration can be written as:

$$\text{Legacy Frame Duration} = (47 \times T_s) + TTG + RTG$$
$$= (47 \times 102.86 \text{ μs}) + 105.71 \text{ μs} + 60 \text{ μs}$$
$$= 0.00500013 \text{ seconds}$$

Therefore, TTG_2 may be written as:

$$TTG\_2 = \text{Legacy Frame Duration} - ((45 \times T_s) + TTG\_1 +)$$
$$RTG\_1 + RTG\_e$$
$$= 0.00500013 - 0.00489442$$
$$= 105.71 \text{ μs}$$

Note: the number of usable symbols in the 0.16m frame is 45, not 47, because two symbols are used for TTG_1 and RTG_1.

To check if the UL allocations begin exactly where they should then:

$$\text{Start of Second } UL \text{ subframe} = (36 \times T_s) + TTG\_1 + RTG\_1 +$$
$$TTG\_2$$
$$= 36 \times 102.86 \text{ μs} + 102.86 \text{ μs} +$$
$$102.86 \text{ μs} + 105.71 \text{ μs}$$
$$= 0.004014390 \text{ seconds}$$
$$(\text{which is the same as above})$$

So far this example has only considered the operation of the legacy MSs, but of course it is important to consider the effect of this on the enhanced MSs. As the first zone of the first DL subframe will contain the signalling for the legacy mobile stations, it is possible to include the 16m signalling within this frame too, but it may also follow the legacy signalling. The 16m signalling may also be included within the DL and UL-MAPs, in this case the legacy MSs will process all allocation IEs until it reaches a Skip IE, which if set to mode=1, will inform all legacy MSs not to process subsequent IEs. This will prevent the legacy MSs from processing 16m signalling. However, when a Skip IE with mode set to 0 is encountered then the legacy MSs will know that they must process subsequent IEs and will do so accordingly. As will be apparent to those skilled in the art, various options exist for which 16m signalling should be included and where it should be located within the DL sub-frame(s). However, it is important to note that 16m MSs can be allocated resources within any of the DL or UL subframes. It is also important to note that the 16m signalling should be transparent to all legacy MSs, and legacy MSs should not be allocated resources where 16m signalling may exist.

In general, the above concept can be applied to any frame configuration where the legacy 5 ms frame may be divided or dissected up into a number of smaller DL and UL subframes. This can be achieved by ensuring that the first DL subframe is of an adequate size to support the legacy 16e and/or 16m signalling/data, and by using DL and UL Zone Switch IEs (or MAP-IEs with DIUC or UIUC=13) to indicate to legacy MSs that no allocations are made within the specified zone.

Figure 4:
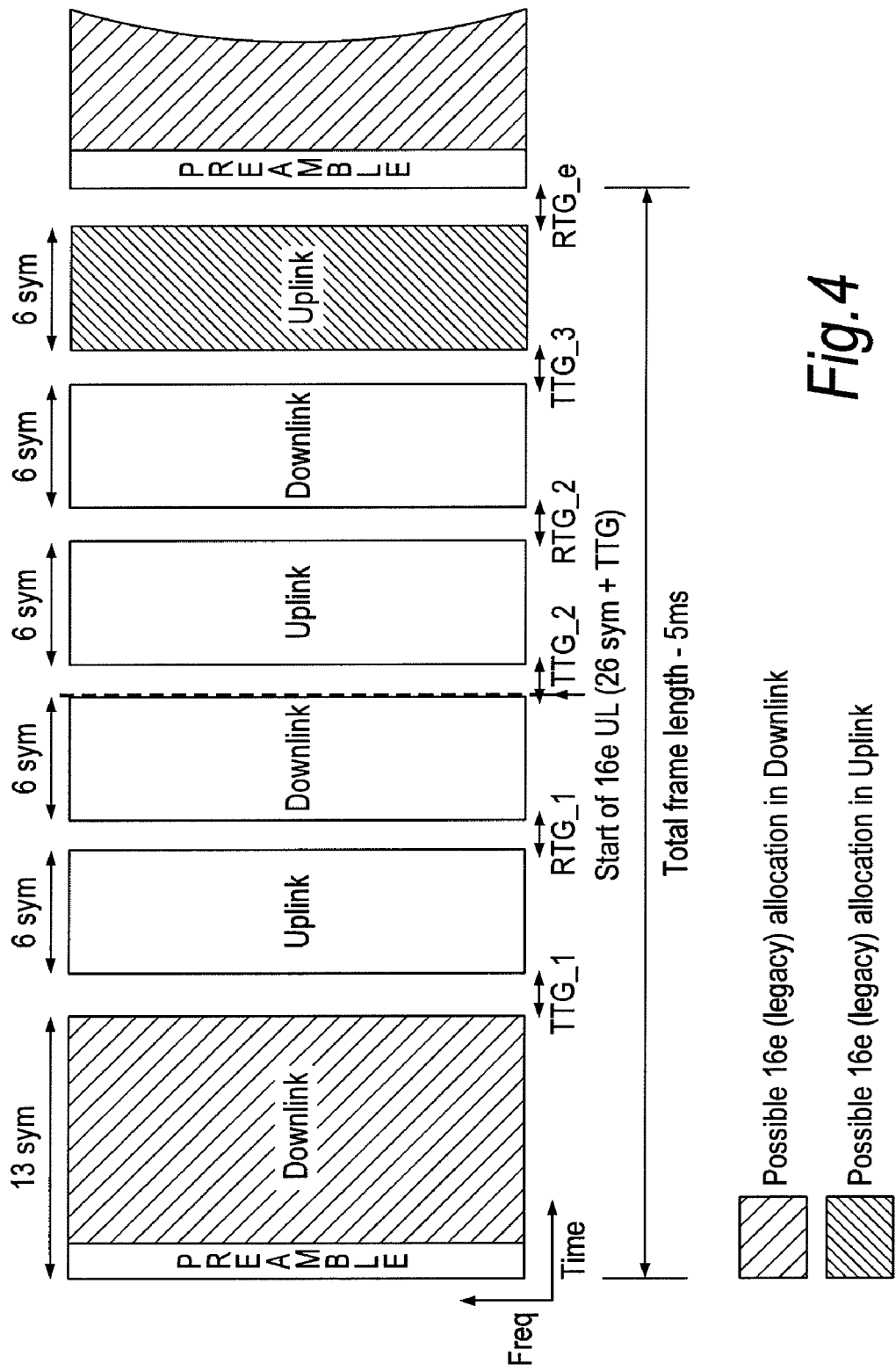
FIG. 4 shows a second example of a frame structure embodying the present invention, having more subframes in comparison with FIG. 3.

A second example of a frame structure embodying the present invention is shown in FIG. 4, where the first DL subframe is larger than that of remaining DL and UL subframes.

Referring to FIG. 4, it is assumed for this example the legacy DL/UL split is (26,21) (WiMAX forum profile release 1.0). As a result a legacy MS can only be assigned DL resources within the first 26 symbols and similarly an UL allocation must be made within the last 21 symbols. Again, in similar fashion to the previous example in FIG. 3, legacy DL allocations will be made within the first DL subframe and the last UL subframe will be used for UL allocations. Note that the symbol counts for legacy UL allocation in FIG. 3 and FIG. 4 are both multiple of 3 symbols; this is preferable to allow for the required subcarrier allocation schemes (AMC and PUSC) to be used in the downlink and uplink. Referring to the example in FIG. 4, the actual legacy allocations are made within the last 6 symbols of the legacy UL as the symbols prior to this are being used by 16m terminals. Moreover, the final UL subframe where the legacy allocations are made is arranged to begin on an integer number of symbols from the beginning of the legacy UL subframe (i.e., $N_{symbols\_in\_DL} \times T_s + TTG$, where $N_{symbols\_in\_DL}$ denotes the number of symbols in the legacy DL subframe: 26 in the present example). This is achieved by suitably setting the durations of TTG_2, RTG_2 and TTG_3, as follows. To calculate these values it is assumed in this case that TTG_1=RTG_1=1 OFDMA symbol and RTG_e=60 μs. Therefore, the start of the legacy UL can be determined by;

$$N_{symbols\_in\_DL} \times T_s + TTG = (26 \times 102.86 \text{ μs}) + 105.71 \text{ μs}$$
$$= 0.00278007 \text{ seconds}$$

The start of the second UL subframe where the legacy allocations are present can be expressed as:

$$\text{Start of Second } UL \text{ subframe} = (N_{symbols\_in\_DL} \times T_s + TTG) +$$
$$(15 \times 102.86 \text{ μs})$$
$$= 0.004322970$$

Therefore, the total time for TTG_2, RTG_2 and TTG_3 may be written as:

$$\begin{aligned}TTG\_2 + RTG\_2 + TTG\_3 &= \text{Legacy Frame Duration} - \\ &\quad ((43 \times T_s) + TTG\_1 +) \\ &\quad RTG\_1 + RTG\_e \\ &= 0.00500013 - 0.004688700 \\ &= 311.43 \ \mu s\end{aligned}$$

The individual durations for TTG_2, RTG_2 and TTG_3 may be written as:

$$\begin{aligned}TTG\_2 &= RTG\_2 \\ &= TTG\_3 \\ &= (TTG\_2 + RTG\_2 + TTG\_3)/3 \\ &= 103.81 \ \mu s\end{aligned}$$

To check if the UL allocations begin exactly where they should then:

$$\begin{aligned}\text{Start of Second } UL \text{ subframe} &= (37 \times T_s) + TTG\_1 + RTG\_1 + \\ &\quad TTG\_2 + RTG\_2 + TTG\_3 \\ &= (37 \times 102.86 \ \mu s) + 102.86 \ \mu s + \\ &\quad 102.86 \ \mu s + 103.81 \ \mu s + \\ &\quad 103.81 \ \mu s + 103.81 \ \mu s \\ &= 0.004322970 \text{ seconds} \\ &\quad \text{(which is the same as above)}\end{aligned}$$

The reason why the arrangement like that of FIG. 3 or FIG. 4 is advantageous for improving latency of enhanced user, is that the time between feedback signalling and data transmission can be reduced. That is, the first uplink subframe can be used to feed back channel quality information (CQI) to the base station. The base station then uses the CQI to perform link adaptation and the same enhanced MS can be scheduled again in the second downlink subframe, therefore reducing the minimum latency. In the example of FIG. 3, the latency is reduced from 5 ms (the length of the legacy frame, in which there is only one downlink subframe and one uplink subframe), to around 2.5 ms. For FIG. 4, the latency is further reduced to around 2.2 ms, considering the length of the first DL and UL subframes (21 symbols including TTG_1 and RTG_1), or as low as 1.4 ms if one considers the second DL and UL subframes (around 14 symbols including TTG_2 and RTG_2).

Figure 5:
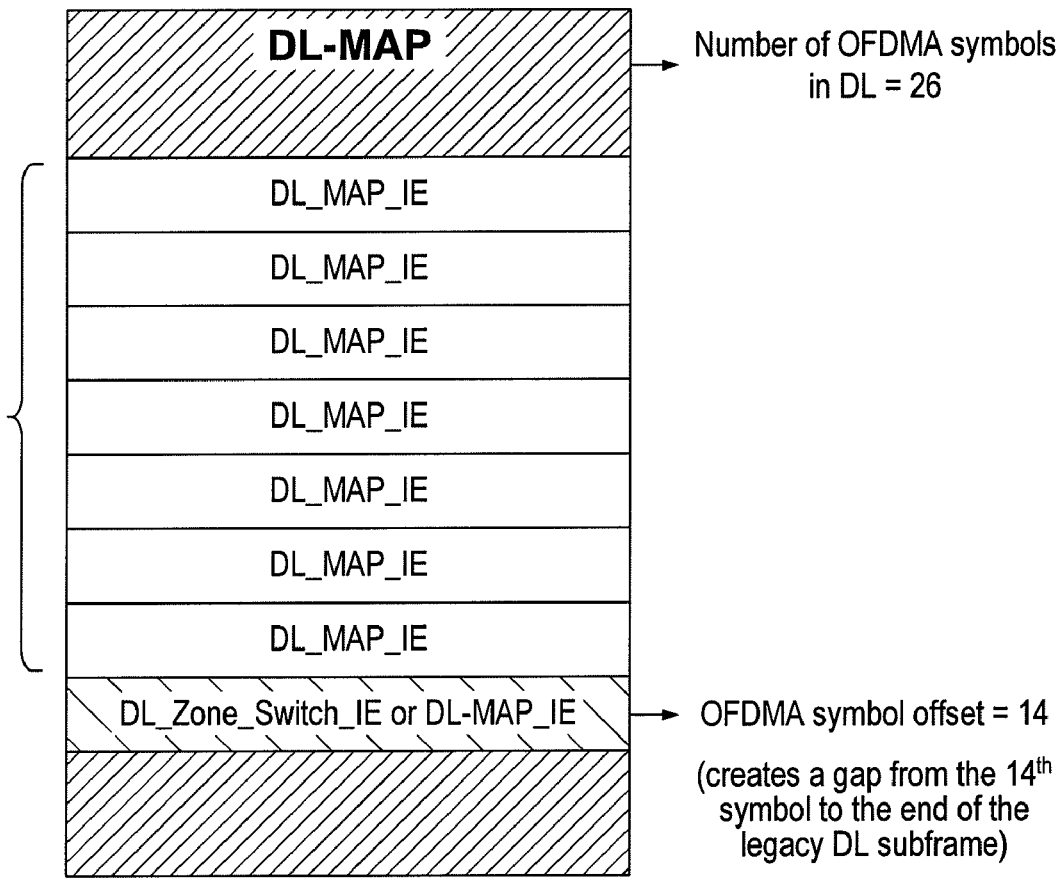
FIG. 5 shows a high-level example of a DL-MAP used in the present invention for communicating information about the frame structure.

It is clear from FIG. 4 that gaps must be created in both the DL and UL, as the symbols within these gaps will be used solely for 16m transmissions. These gaps can be created by using DL and UL Zone Switch IE or MAP-IE with DIUC=13 for DL and UIUC=13 for UL. So, by referring to the example in FIG. 4, a gap must be created between symbols 14 and 26 (inclusive) for the downlink. FIG. 5 illustrates a high level example of the DL-MAP that may be used to allocate users within the first DL subframe and to create a gap for 16m transmissions.

Figure 6:
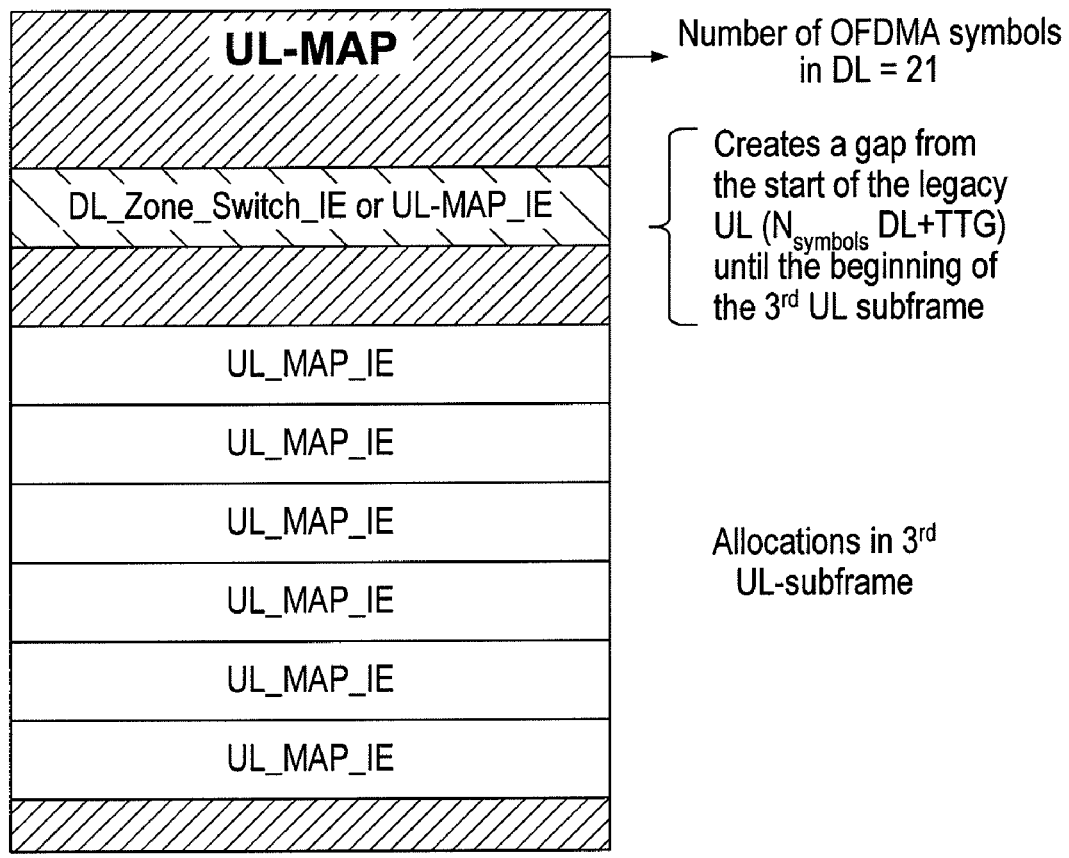
FIG. 6 shows a high-level example of a UL-MAP used in the present invention for communicating information about the frame structure.

As mentioned previously, a gap must also be created in the Uplink, however this gap must be created at the beginning of the legacy UL subframe before any actual legacy allocations are made. FIG. 6 illustrates a high level example of a UL-MAP that may be used to allocate resources to legacy terminals into the last UL subframe of the proposed frame structure in FIG. 4. It is clear from FIG. 6, that in order to create this gap then a UL Zone Switch IE with UIUC=15 or UL MAP-IE with UIUC=13 at the beginning of the UL-MAP is required.

It is clear from the two proposed frame structure examples in FIGS. 3 and 4 that it is possible to alter the frame configuration depending on the desired number of 16e or 16m MSs that are required to be supported. For example, if the majority of terminals are 16e (legacy) then a frame structure similar to FIG. 3 would be desired; on the other hand, if the terminals are predominantly 16m then a frame structure similar to that of FIG. 4 would be preferred as this would certainly improve the latency issues discussed earlier. An almost seamless transition from a frame structure that is more legacy like to a frame structure that will be used to support a high number of 16m terminals can be performed by gradually varying the frame configuration to add more downlink subframes and uplink subframes.

This process can also occur dynamically, i.e, during operation of the wireless communication system, by broadcasting the frame configuration in a DCD type message (fragmentable broadcast). This message could transmit information such as Number of symbols in each subframe, TTG and RTG times, and the total number of subframes within the frame. This will allow for all 16m MSs to understand and adapt to the new frame configuration. The 16e terminal need not understand this message as the 16m BS will arrange the allocations for the legacy terminals by adhering to the approach described previously (Zone Switch IE or MAP-IE with DIUC/UIUC=13 etc).

Figure 7:
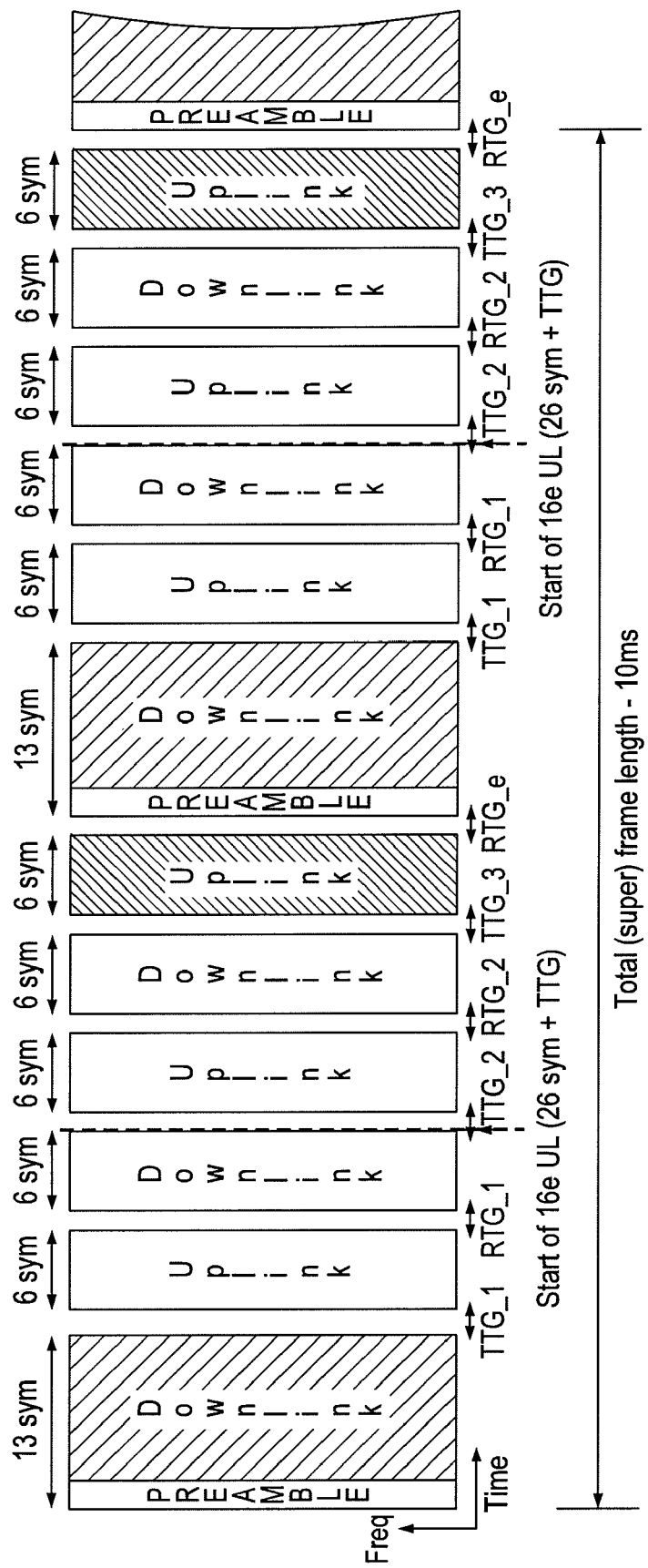
FIG. 7 shows another embodiment of the present invention in which two or more frames are combined into a "superframe".

As all previous examples have concentrated on the backwards compatibility for 16e terminals, it is also important to consider the operation of the 16m terminals within the proposed frame structures. It is clear from the methods discussed above that in order to support any 16e users then the preamble must be present every 5 ms and immediately following the preamble must be the legacy signalling (FCH DL and UL MAPs etc). For 16m purposes it is possible to concatenate two or more of the proposed frame structures in either FIG. 3 or 4 to create a 16m 'superframe'. A proposed superframe structure is shown in FIG. 7, where two frames (FIG. 4—frame structure) have been concatenated.

In this example, for 16m terminals, it is preferable to logically number the DL and UL subframes within the superframe. Having the subframes numbered will allow the BS to assign resources to 16m users via an appropriate signalling mechanism using the desired sub-frame number of which the allocation will exist. The actual positioning of the 16m signalling can be in any of the sub-frames but it is preferred for this signalling to be present in the first DL subframe of the superframe following the legacy signalling. A signalling mechanism can then be used to allocate resources to 16m terminals in any of the subframes within the superframe. It may also be possible for 16m terminals to make use of the midamble (intermediate preamble or preambles) within the superframe as this may aid with synchronisation for high mobility users. Thus, in the proposed superframe structure, signalling is distributed or decomposed (i.e. some elements of the control signalling are per superframe, some per frame and some per subframe).

This invention proposes a novel frame structure that is flexible and therefore capable of adapting to a system that is evolving from supporting predominantly legacy terminals to one which will be supporting an increasing number of 16m terminals. The coexistence of both legacy and 16m terminals within the proposed frame structure will have minimal impact of the performance of legacy MSs. Depending on the required number of either legacy or 16m terminals that need to be supported, the BS will have the ability to define a frame configuration where the number of subframes per frame is configured based on the feature set of the operational subscriber stations and the mobility requirements of enhanced feature mobile stations (16m) such that the frame structure at all times retains sufficient features to support the attachment of legacy stations that do not support the enhanced features of 16m.

Therefore, the general form of the proposed frame structure is as follows:

(a) An entity that (dynamically) controls the frame format configuration (BS and MS) and may decide whether it is supporting legacy, enhanced or both types of subscriber stations.

(b) In particular the control entity at the BS (or in the network e.g. at the Access Service Network Gateway (ASN-GW)) that accounts for the number of legacy and enhanced feature MSs and the situation of the stations (e.g. mobility) and partitions the resources used for each type appropriately (c) The control entity can also detect the situation of the enhanced features MSs and determine the optimum frame configuration (i.e. number of frames per superframe and number of subframes per frame), taking into account increase in overhead for more subframes vs. improvement in performance for high mobility.

To summarise, this invention provides a novel frame structure that is flexible and therefore capable of adapting to a system that is evolving from supporting predominantly legacy terminals to one which will be supporting an increasing number of enhanced terminals. The coexistence of both legacy and enhanced terminals within the proposed frame structure will have minimal impact of the performance of legacy MSs. Depending on the required number of either legacy or enhanced terminals that need be supported, the BS will have the ability to define a frame configuration where the number of subframes per frame is configured based on the feature set of the operational subscriber stations and the mobility requirements of enhanced feature mobile stations such that the frame structure at all times retains sufficient features to support the attachment of legacy stations that do not support the enhanced features of newer communications standards (such as that currently referred to as IEEE802.16m or Advanced/Gigabit WiMAX).

The present invention may take the form of a novel BS or MS, or hardware modules for the same, and can be implemented by replacing or modifying software executed by processors of the BS and/or each MS. In systems wherein relay stations are provided having some of the functionality of a base station, the present invention may also be applied to each relay station.

Thus, embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of the above-described base station. The invention may also be embodied as one or more device or apparatus programs (e.g. computer programs and computer program products) for carrying out part or all of any of the techniques described herein, including adaptation of a 0.16m MS to handle the novel frame format proposed herein. Such programs embodying the present invention may be stored on computer-readable media, or could, for example, be in the form of one or more signals. Such signals may be data signals downloadable from an Internet website, or provided on a carrier signal, or in any other form.

Although the above description has referred to an IEEE 802.16 wireless communication system by way of example, the invention may be applied to other frame-based communication systems in which resource allocation is made on a frame-by-frame basis, and there is a need to serve both legacy and enhanced terminals from the same base station.

INDUSTRIAL APPLICABILITY

Embodiments of the present invention can provide the following advantages:

can ultimately reduce latencies for enhanced feature MSs, thus increasing the support for users travelling at high mobility.

provide the capability for a seamless transition from a system supporting predominantly legacy terminals to a system supporting an increasing number of terminals with an enhanced feature set.

enable the system to potentially provide transparent operation to a legacy TDD terminal.

allow the new enhanced feature BS to provide full support to legacy MSs.

The invention claimed is:

1. A wireless communication system comprising a base station and a plurality of fixed or mobile subscriber stations, the base station maintaining connections with each of the subscriber stations by performing wireless communication in units of frames, and within each frame, allocating resources for data transmissions and signalling in the wireless communication system, said frames being divided timewise into downlink subframes for transmissions from the base station to the subscriber stations, and uplink subframes for transmissions from the subscriber stations to the base station; characterized in that each frame has a plurality of downlink subframes and a plurality of uplink subframes including, in time order, a first downlink subframe, a first uplink subframe, a final downlink subframe and a final uplink subframe, and in that the subscriber stations comprise first type subscriber stations and second type subscriber stations, the base station allocating downlink resources to the first type subscriber stations only within the first downlink subframe, said wireless communication system being in the form of a TDD OFDMA wireless communication system operable in accordance with a plurality of communication standards, the first type subscriber stations being compliant with a first such standard and the second type subscriber stations being compliant with a second such standard which is a development of the first standard, wherein said first standard assumes frames of predetermined length with a single downlink subframe and a single uplink subframe, and the base station is arranged to configure the frame such that the timing of said plurality of downlink subframes and uplink subframes allows the frame to be compatible with said first standard whilst including at least one downlink subframe and uplink subframe reserved for use by the second-type subscriber stations, wherein the base station is operable to vary the number of downlink subframes and uplink subframes dynamically during operation of the wireless communication system, wherein the base station is responsive to the relative number of first type and second type subscriber stations when varying the number of downlink subframes and uplink subframes.

2. The wireless communication system according to claim 1 wherein each downlink subframe is separated from its succeeding uplink subframe, and each uplink subframe is separated from its succeeding downlink subframe if any, by a respective defined time gap, and the base station is arranged to set the duration of at least one such gap, which follows one of the subframes reserved for the second-type subscriber stations, to make the frame compatible with said first standard, wherein data is transmitted in the system using symbols of predetermined duration, each subframe including an integral number of said symbols, and the duration of said at least one gap is set such that a set of said symbols occur at timings in accordance with both said first standard and said second standard.

3. The wireless communication system according to claim 1 wherein each frame is a superframe which includes a plurality of frames in accordance with said first standard.

4. A base station for use in wireless communication system with a plurality of fixed or mobile subscriber stations which comprise legacy subscriber stations and enhanced subscriber stations, the base station maintaining connections with each of the subscriber stations by performing wireless communication in units of frames, and within each frame, allocating resources for data transmissions and signalling in the wireless communication system, said frames being divided timewise into downlink subframes for transmissions from the base station to the subscriber stations, and uplink subframes for transmissions from the subscriber stations to the base station, wherein the base station is arranged to:
  configure each frame with a plurality of downlink subframes and a plurality of uplink subframes including, in time order, a first downlink subframe, a first uplink subframe, a second downlink subframe and a second uplink subframe;
  allocate downlink resources to the legacy subscriber stations only within the first downlink subframe; and
  allocate resources to the enhanced subscriber stations at least within the first uplink subframe and the second downlink subframe,
  wherein the base station is operable to vary dynamically the number of downlink subframes and uplink subframes in each frame or superframe in accordance with the relative proportion of enhanced subscriber stations to legacy subscriber stations currently being served by the base station.

* * * * *